United States Patent
Kim et al.

(10) Patent No.: US 10,674,447 B2
(45) Date of Patent: Jun. 2, 2020

(54) INFORMATION TRANSMITTER AND AN APPARATUS INCLUDING THE SAME

(71) Applicant: WITS Co., Ltd., Yongin-si, Gyeonggi-do (KR)

(72) Inventors: Hee Seung Kim, Suwon-si (KR); Jae Sun Won, Suwon-si (KR); Hugh Kim, Suwon-si (KR); Jae Suk Sung, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 238 days.

(21) Appl. No.: 15/342,439

(22) Filed: Nov. 3, 2016

(65) Prior Publication Data

US 2017/0181086 A1 Jun. 22, 2017

(30) Foreign Application Priority Data

Dec. 17, 2015 (KR) .................. 10-2015-0181275
Feb. 3, 2016 (KR) .................. 10-2016-0013463

(51) Int. Cl.
*H04W 52/02* (2009.01)
*H04B 5/00* (2006.01)

(52) U.S. Cl.
CPC ...... *H04W 52/0229* (2013.01); *H04B 5/0031* (2013.01); *H04B 5/0081* (2013.01); *Y02D 70/00* (2018.01); *Y02D 70/164* (2018.01); *Y02D 70/26* (2018.01); *Y02D 70/42* (2018.01)

(58) Field of Classification Search
CPC ............ H04W 52/0229; H04B 5/0031; H04B 5/0081; Y02D 70/164; Y02D 70/42; Y02D 70/26; Y02D 70/00
See application file for complete search history.

(56) References Cited

U.S. PATENT DOCUMENTS

| | | | |
|---|---|---|---|
| 2004/0239662 A1 | 12/2004 | Hosokawa et al. | |
| 2009/0091269 A1* | 4/2009 | Perin | H05B 41/2885 315/250 |
| 2013/0299586 A1* | 11/2013 | Yesil | G06K 7/084 235/449 |
| 2014/0117910 A1* | 5/2014 | Le | G01R 31/42 318/490 |
| 2014/0253120 A1* | 9/2014 | Ugurbil | A61B 5/055 324/309 |
| 2014/0269946 A1* | 9/2014 | Wallner | G06K 7/08 375/256 |
| 2015/0349849 A1 | 12/2015 | Joehren | |

FOREIGN PATENT DOCUMENTS

KR    10-2004-0090902 A    10/2004

* cited by examiner

*Primary Examiner* — Oussama Roudani
(74) *Attorney, Agent, or Firm* — Harness, Dickey & Pierce, P.L.C.

(57) ABSTRACT

There are provided an information transmitter and an apparatus including the same. The information transmitter includes a signal generator configured to output an information signal including pulses changed from a first state to a second state or a third state and subsequently changed from the second state or the third state to the first state. A time period in which some of the pulses are changed from the first state to the second state or the third state may be shorter than a time period in which some of the pulses are changed from the second state or the third state to the first state. The information transmitter also includes a transmitting coil configured to receive the information signal and generate a magnetic field based on the information signal.

12 Claims, 5 Drawing Sheets

INFORMATION TRANSMITTER AND AN APPARATUS INCLUDING THE SAME

CROSS-REFERENCE TO RELATED APPLICATION(S)

This application claims benefit of priority to Korean Patent Application Nos. 10-2015-0181275 filed on Dec. 17, 2015 and 10-2016-0013463 filed on Feb. 3, 2016 in the Korean Intellectual Property Office, the disclosures of which are incorporated herein by reference in their entirety.

BACKGROUND

1. Field

The following description relates to an information transmitter, and an apparatus including the same.

2. Description of Related Art

A technology to transmit information wirelessly has been variously applied in many fields. Recently, information transmitting technology has been increasingly used in a mobile apparatuses. For example, mobile payment apparatuses and methods using information transmitting technology have increased.

However, when information transmitting technology is used in mobile apparatuses, a size of a battery may be limited due to miniaturization of the mobile apparatus. Therefore, it is desired to reduce power consumption within a mobile apparatus implementing the information transmitting technology.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, an information transmitter or an apparatus is described to reduce power consumption.

In accordance with an embodiment, there may be provided an apparatus including: a signal generator configured to output an information signal including pulses changed from a first state to a second state or a third state and subsequently changed from the second state or the third state to the first state, wherein a time period in which some of the pulses are changed from the first state to the second state or the third state may be shorter than a time period in which some of the pulses are changed from the second state or the third state to the first state; and a transmitting coil configured to receive the information signal and generate a magnetic field based on the information signal.

The first state may be a state of zero voltage (0V), the second state may be a state of a positive reference voltage, and the third state may be a state of a negative reference voltage.

The information signal may have a step function form in response to being changed from the first state to the second state or the third state.

The information signal may linearly change with respect to a time in some sections thereof in response to the information signal changing from the second state or the third state to the first state.

The information signal may exponentially change with respect to a time in some sections in response to the information signal changing from the second state or the third state to the first state.

The information signal may be maintained in the second state or the third state for a predetermined period of time after the information signal changes from the first state to the second state or the third state, and the information signal changes from the second state or the third state to the first state after the predetermined period of time elapses.

The signal generator may include: a storage configured to store information signal values corresponding to a magnitude of the information signal based on a time and provide the information signal values; and a generator configured to generate the information signal in response to the information signal values.

The signal generator may include: a controller configured to output a control signal based on information to be transmitted; and a generator configured to output the information signal in response to the control signal.

The generator may include: a capacitor connected to the transmitting coil in series; and a switching part configured to apply a voltage to one end of the capacitor in response to the control signal.

The information transmitter may transmit information based on a magnetic secure transfer scheme.

In accordance with an embodiment, there may be provided an apparatus including: a battery configured to supply power; and an information transmitter configured to receive the power and transmit information and including a signal generator configured to output an information signal including pulses changed from a first state to a second state or a third state and subsequently changed from the second state or the third state to the first state, wherein a time period in which some of the pulses are changed from the first state to the second state or the third state may be shorter than a time period in which some of the pulses are changed from the second date or the third state to the first state; and a transmitting coil configured to receive the information signal and generate a magnetic field based on the information signal to transmit the information.

The first state may be a voltage of zero voltage (0V), the second state may be a state of a positive reference voltage, and the third state may be a state of a negative reference voltage.

The information signal may have a step function form in response to being changed from the first state to the second state or the third state.

The information signal may be maintained in the second state or the third state for a predetermined period of time after the information signal changes from the first state to the second state or the third state, and the information signal changes from the second state or the third state to the first state after the predetermined period of time elapses.

The signal generator may include: a storage configured to store information signal values corresponding to a magnitude of the information signal based on a time and provide the information signal values; and a generator configured to generate the information signal in response to the information signal values.

The signal generator may include: a controller configured to output a control signal based on information to be transmitted; and a capacitor connected to the transmitting coil in series; and a switching part configured to apply a voltage to one end of the capacitor in response to the control signal.

In accordance with another embodiment, there may be provided an information transmitter, including: a signal generator including a storage configured to store an information signal value corresponding to a magnitude of an information signal, and a generator configured to generate an information signal having a magnitude corresponding to the information signal value, wherein the information signal may include a pulse shifted from a first state to a second state or a third state in a time period, and may include a pulse shifted from the second state or the third state to the first state in another time period, the time period being shorter than the another time period, and the first state may include an intermediate voltage level between the second state and the third state, and the third state may include a voltage level lower than the second state; and a transmitting coil configured to produce a magnetic flux based on the information signal.

The second state may be a positive reference voltage, the third state may be a negative reference voltage, and the first state may be zero voltage.

An amount of consumed power may be in proportion to a value obtained by integrating a square of a voltage of the information signal applied to a transmitting coil with respect to a time.

The magnetic flux may vary based on a type of the information signal to be transmitted.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the main any possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The contents of the present application described below may have a variety of configurations and propose various configurations herein, but are not limited thereto.

Figure 1:
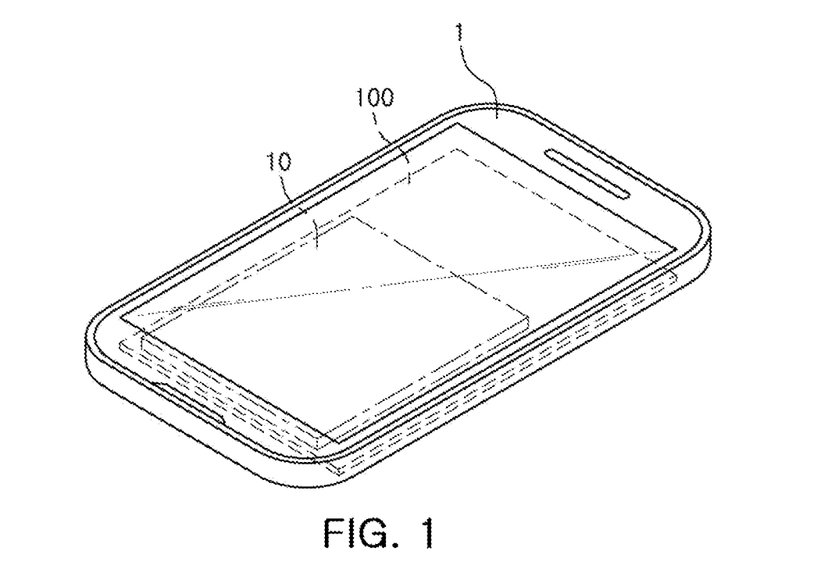
FIG. 1 is a view schematically illustrating an apparatus including an information transmitter, according to an embodiment.

FIG. 1 is a view schematically illustrating an apparatus including an information transmitter, according to an embodiment. The apparatus 1 according to an exemplary embodiment in the present disclosure may include a battery 10 and an information transmitter 100.

As illustrated in FIG. 1, the apparatus 1 including the information transmitter 100, according to an embodiment, may be a mobile apparatus such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The battery 10 supplies power to the information transmitter 100 and other structural devices of the apparatus 1.

The information transmitter 100 transmits information, such as data, voice, or image, to be transmitted using a change in a magnetic field. The information transmitter 100 may be a processor or a controller configured to transmit the information. The information transmitter 100 includes a signal generator (to be described and illustrated in FIG. 2, for instance) that generates an information signal corresponding to the information to be transmitted, and a transmitting coil (to be described and illustrated in FIG. 2, for instance) that changes a magnetic field depending on the information signal. In an example, the transmitting coil (to be described and illustrated in FIG. 2, for instance) has a planar coil shape formed on a substrate. In addition, the signal generator (to be described and illustrated in FIG. 2, for instance) may be entirely or partially disposed on the substrate or may be entirely or partially disposed within the apparatus 1.

Figure 2:
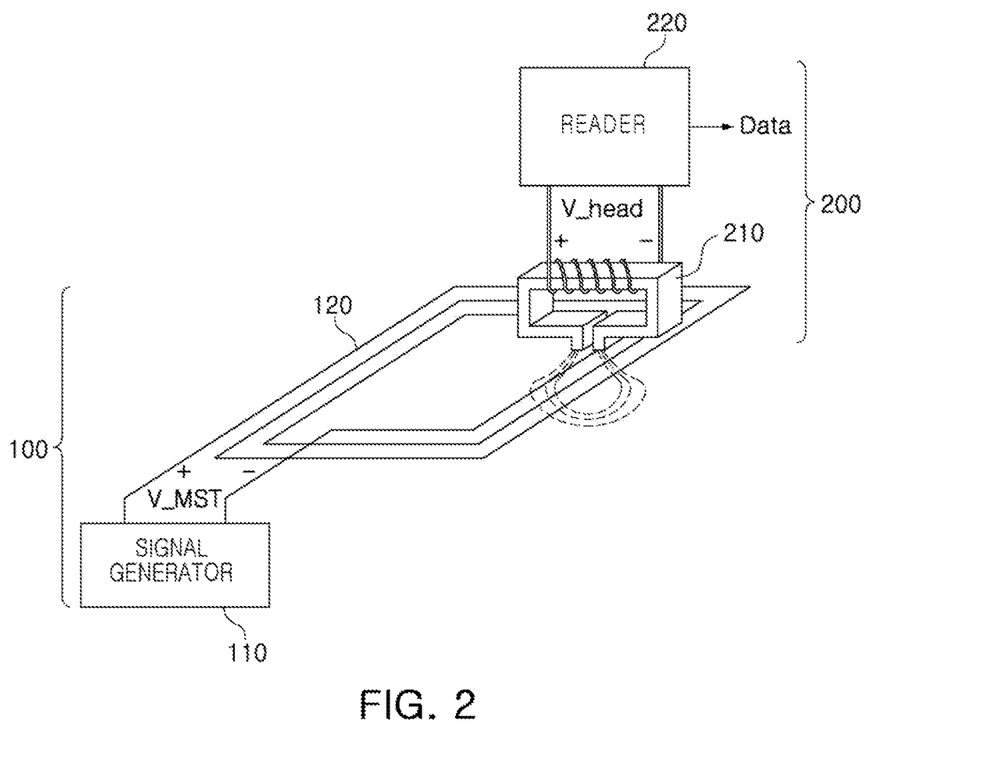
FIG. 2 is a view schematically illustrating a system including an information transmitter, according to an embodiment.

FIG. 2 is a view schematically illustrating a system including an information transmitter, according to an embodiment. The information transmitter 100, according to an embodiment, includes a signal generator 110 and a transmitting coil 120. In FIG. 2, a reference numeral 200 refers to an information receiver, and the information receiver 200 includes a reading coil 210 and a reader 220.

The information transmitter 100 changes or varies a magnetic field depending on the information to be transmitted. The information to be transmitted may be information encrypted for payment, such as credit card information, video, or audio information.

The signal generator 110 generates an information signal V_MST corresponding to the information to be transmitted, and applies the generated information signal V_MST to the transmitting coil 120. In one embodiment, the information signal V_MST is a signal of which a voltage is changed or a signal of which a current is changed.

A change in a magnetic field depending on the information signal V_MST is generated in the vicinity of the transmitting coil 120. That is, when the information signal V_MST of which a voltage or a current is changed is applied to the transmitting coil 120, magnetic flux is generated in the vicinity of the transmitting coil 120 due to Ampere's circuital law.

The information receiver 200 outputs data in response to the change in the magnetic field generated by the information transmitter 100.

The reading coil 210 has a structure in which a coil is wound around a core, as illustrated in FIG. 2. A voltage V_head across the coil of the reading coil 210 may be varied depending on a change in the surrounding magnetic field. That is, the reading coil 210 may output the voltage V_head in response to the change in the magnetic field.

The reader 220 outputs data, Data, as shown in FIG. 2, in response to the voltage V_head across the coil of the reading coil 210. For example, the reader 220 senses the voltage V_head across the coil of the reading coil 210 and converts the sensed voltage into a digital signal, thereby outputting the data, Data. The data, Data, is, for example, card information. The reader 220 may also output the data, Data, in response to a current flowing through the coil of the reading coil 210.

That is, when the information signal V_MST, of which the voltage or the current is changed depending on the information to be transmitted, is applied to the transmitting coil 120, the magnetic flux is generated in the vicinity of the transmitting coil 120 due to the Ampere's circuital law, and when the magnetic flux is applied to a head portion of the reading coil 210, the voltage V_head is generated across the coil of the reading coil 210. However, to improve efficiency power consumption is significantly reduced between the information transmitter 100 and the information receiver 200. A reduction in power consumption is advantageous in apparatuses including the information transmitter 100, for example, used in a mobile apparatus such as a smartphone, or other electronic devices, or a small information technology (IT) apparatus such as a smart watch.

As illustrated in FIGS. 1 and 2, a magnetic secure transfer (MST) transmitting information using the magnetic field may have an advantage that an existing credit card payment machine may be used as the information receiver 200.

A case in which the information transmitter uses a magnetic secure transfer (MST) scheme has been described by way of example in FIGS. 1 and 2, but an information transmitter and an information transmitting method according to the present disclosure may also be used in a case of transmitting information in another scheme.

Figure 3:
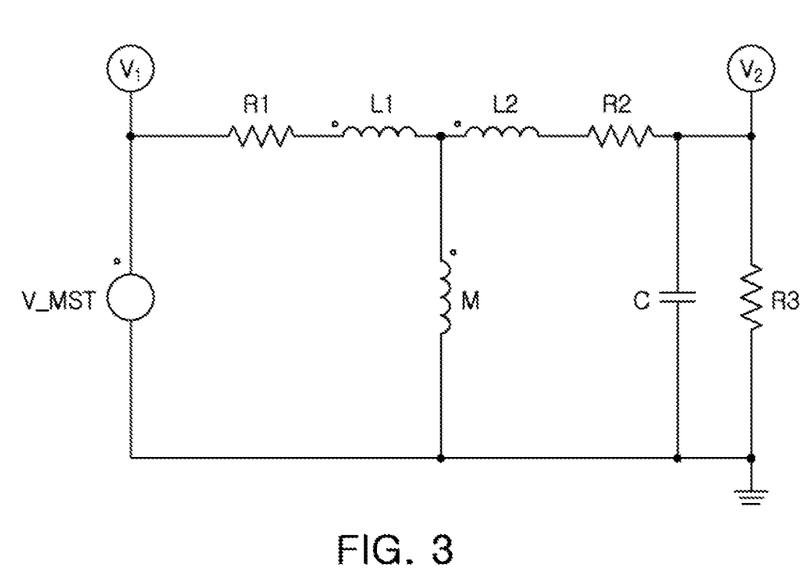
FIG. 3 is an equivalent circuit diagram viewed from two terminals of a transmitting coil of the information transmitter, according to an embodiment illustrated in FIG. 2.

FIG. 3 is an equivalent circuit diagram viewed from two terminals of a transmitting coil 120 of the information transmitter 100, according to an embodiment illustrated in FIG. 2.

In FIG. 3, R1 refers a resistor having a resistance value of the transmitting coil 120 (see FIG. 2), L1 refers to an inductor having an inductance of the transmitting coil 120 (see FIG. 2), M refers to an inductor having a mutual inductance between the transmitting coil 120 (see FIG. 2) and the reading coil 210 (see FIG. 2), L2 refers to an inductor having an inductance of the reading coil 210 (see FIG. 2), R2 refers to a resistor having a resistance value of the reading coil 210 (see FIG. 2), and C and R3 refer to a resistor and a capacitor corresponding to an internal impedance of the reader 220 (see FIG. 2), respectively. In FIG. 3, a voltage in a node V1 may be a voltage of the information signal V_MST applied to the transmitting coil 120 (see FIG. 2), and a voltage in a node V2 may be the voltage V-head across the coil of the reading coil 210 (see FIG. 2).

In an embodiment of FIG. 3, an amount of consumed power is in proportion to a value obtained by integrating a square of the voltage of the information signal V_MST applied to the transmitting coil 120 (see FIG. 2) with respect to a time. Therefore, when the information signal V_MST is applied so that the value obtained by integrating the square of the voltage of the information signal V_MST with respect to a time becomes small, the consumed power is reduced. However, the voltage V_head appearing across the coil of the reading coil 210 (see FIG. 2) is the same as a voltage in, for example, a scheme in which a magnetic card is read by an information receiver in a case of the magnetic secure transfer).

Figure 4A:
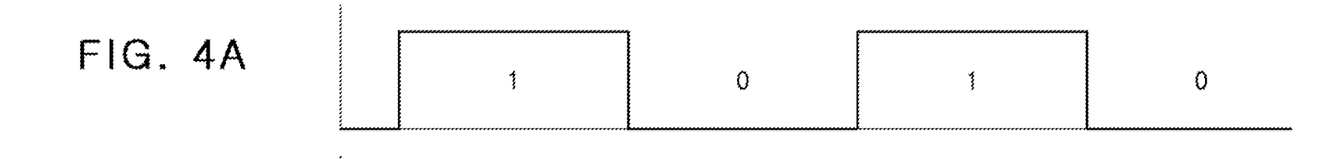
FIGS. 4A through 4E is a view illustrating a waveform of an information signal V_MST applied to a transmitting coil, a voltage across a coil of a reading coil of an information receiver, and consumed power, according to an embodiment.
Figure 4B:
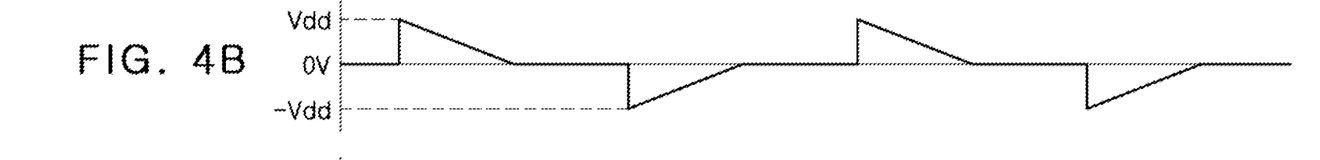
Figure 4C:
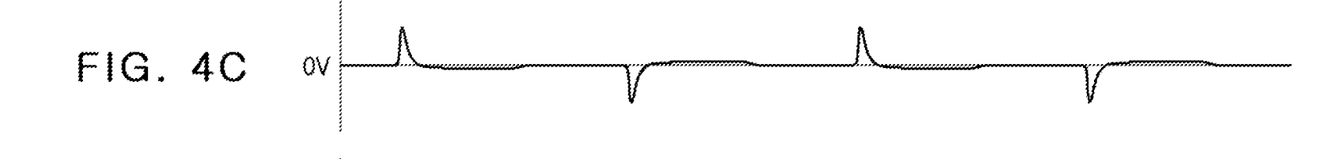
Figures 4D, 4E:
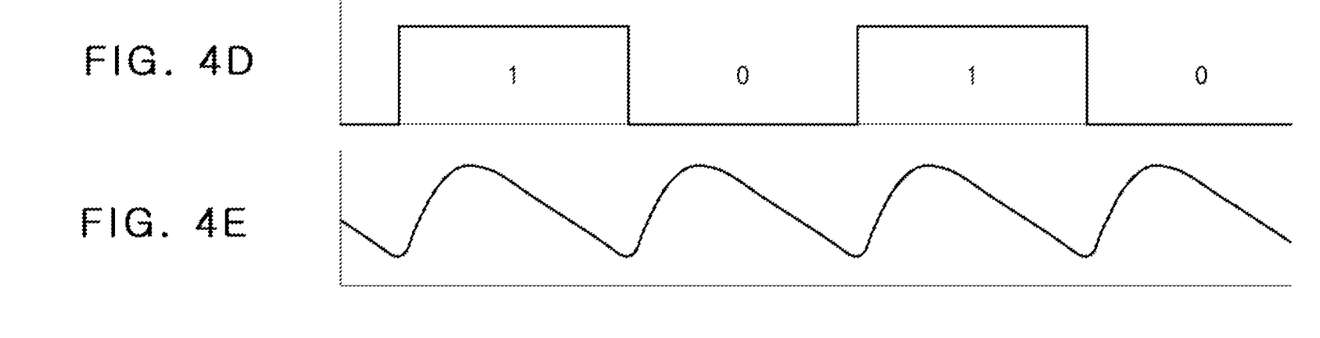

FIGS. 4A through 4E are views illustrating a waveform of an information signal V_MST applied to a transmitting coil, a voltage V_head across a coil of a reading coil of an information receiver, and power consumed, according to an embodiment. FIG. 4A illustrates the information to be transmitted, FIG. 4B illustrates a waveform of the information signal V_MST applied to the transmitting coil, FIG. 4C illustrates a waveform of the voltage V_head across the coil of the reading coil 210 (see FIG. 2), FIG. 4D illustrates the data, Data, (see FIG. 2) output by the reader 220 (see FIG. 2), and FIG. 4E illustrates the power consumed. Vertical axes FIGS. 4B and 4C refer to a voltage, a vertical axis of FIG. 4E refers to a power, and horizontal axes of FIGS. 4A through 4E refer to a time.

As illustrated in FIGS. 4A through 4E, in the information transmitter and the information transmitting method, according to an embodiment, the information signal V_MST including pulses shifted from a first state to a second state or a third state in a relatively short period of time (that is, a time period shorter than the pulse shifting from the second state or the third state to the first state) and shifted from the second state or the third state to the first state in a relatively long period of time (that is, a time period longer than the pulse shifting from the first state to the second state or the third state) and corresponding to the information to be transmitted and applied to the transmitting coil 120 (see FIG. 2). The second state may be a state (for example, a positive reference voltage Vdd) having a high level, the third state may be a state (for example, a negative reference voltage −Vdd) having a low level, and the first state may be a state (for example, zero voltage 0V) having an intermediate level between the second state and the third state.

For example, as illustrated in FIG. 4A, in a case of intending to transmitting information of which a digital value is "1010", the information signal V_MST including pulses having a waveform with a triangular wave shape as illustrated in FIG. 4B may be applied to the transmitting coil 120 (see FIG. 2).

In a case in which the signal as illustrated in FIG. 4B is applied to the transmitting coil 120 (see FIG. 2), the voltage across the coil of the reading coil 210 (see FIG. 2) may appear as illustrated in FIG. 4C.

The reader 220 (see FIG. 2) may determine that the received data is 1 when the voltage across the coil of the reading coil 210 (see FIG. 2) becomes a positive threshold voltage or more, and determine that the received data is 0 when the voltage across the coil of the reading coil 210 (see FIG. 2) becomes a negative threshold voltage or less. Therefore, in a case in which the voltage across the coil of the reading coil 210 (see FIG. 2) appears as illustrated in FIG. 4C, a value of the data output by the reader 220 (see FIG. 2) may be "1010", as illustrated in FIG. 4D.

In addition, in this case, the power consumed in the information transmitter 100 (see FIG. 2) is illustrated in FIG. 4E.

As illustrated in FIG. 4B, according to an embodiment, the voltage of the information signal V_MST applied to the transmitting coil 120 (see FIG. 2) rapidly changes into a high level or a low level. Therefore, a voltage having a pulse shape as illustrated in FIG. 4C is generated across the coil of the reading coil 210 (see FIG. 2). In addition, according to an embodiment, the voltage of the information signal V_MST applied to the transmitting coil 120 (see FIG. 2) changes to a high level or a low level and then slowly changes to 0V. Therefore, the power consumed in the information transmitter 100 (see FIG. 2) is further reduced compared to a case in which the voltage of the information signal V_MST is maintained at the high level or the low level.

FIGS. 5A through 5F are views illustrating various types of information signals applied to a transmitting coil in an information transmitter and an information transmitting method, according to an embodiment.

As illustrated in FIGS. 5A through 5F, the information signals include various pulses shifted from a first state to a second state or a third state in a relatively short time and shifted from the second state or the third state to the first state in a relatively long time. For example, the pulses of the information signals are various signals satisfying a condition having a form such as step function in an example in which they are changed from 0V to a high level or a low level, and a condition in which a change ratio depending on a time is a first reference value or more and satisfying a condition having another form, which is not the step function in a case in which they are changed from the high level or the low level to 0V. Furthermore, the pulses of the information signals may also be various signals satisfying a condition in which a change ratio depending on a point in time or a time period is a second reference value or less. The first reference value may be a value equal to or greater than the second reference value. That is, each of the pulses of the information signals may linearly change, exponentially change, or change in a form of a non-linear function in the case in which each of the pulses of the information signals changes from the high level or the low level to 0V.

Figure 5A:
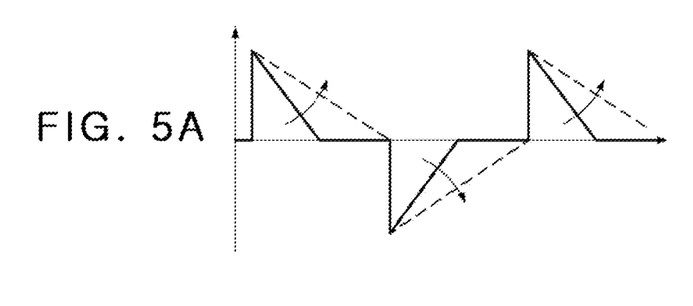
FIGS. 5A through 5F is a view illustrating various types of information signals applied to a transmitting coil in an information transmitter and an information transmitting method, according to an embodiment.
Figure 5B:
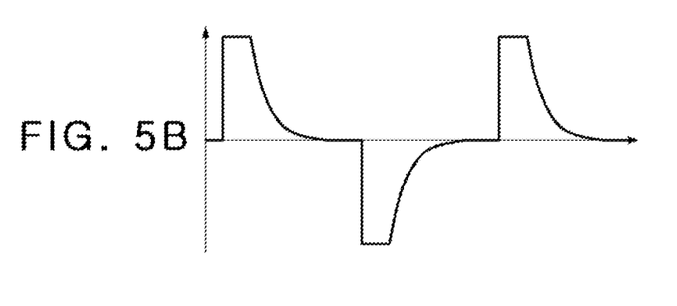
Figure 5C:
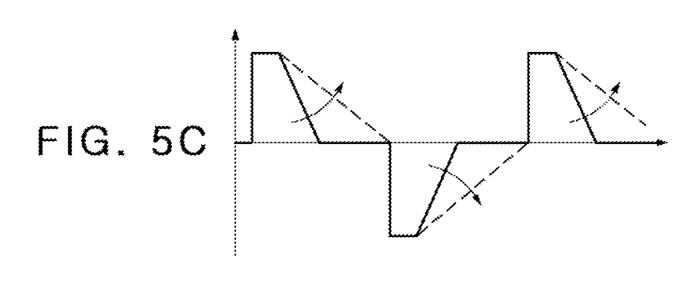
Figure 5D:
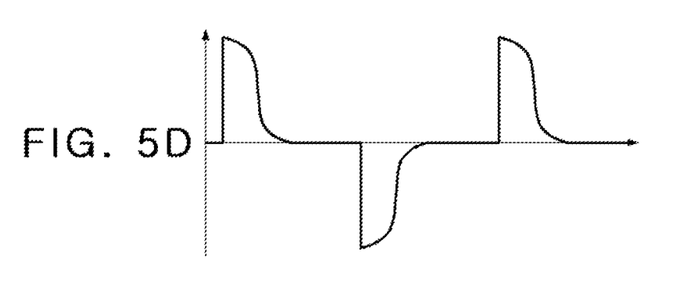

In addition, the information signals may also be maintained in the high level or the low level for a predetermined period of time, as illustrated in FIGS. 5B and 5C. The information signals are embodied as described above, whereby the possibility that an error occurring in a process of transmitting information (that is, a case in which transmitted information and received information are different from each other) is further reduced.

In addition, as illustrated in FIGS. 5A and 5C, a gradient of each of the pulses may vary in a case in which each of the pulses is changed from the high level or the low level to 0V. As the gradient becomes gentle or minimal, the possibility that the error in the process of transmitting information will occur is further reduced, and as the gradient becomes rapid, the consumed power is further reduced.

Figure 6:
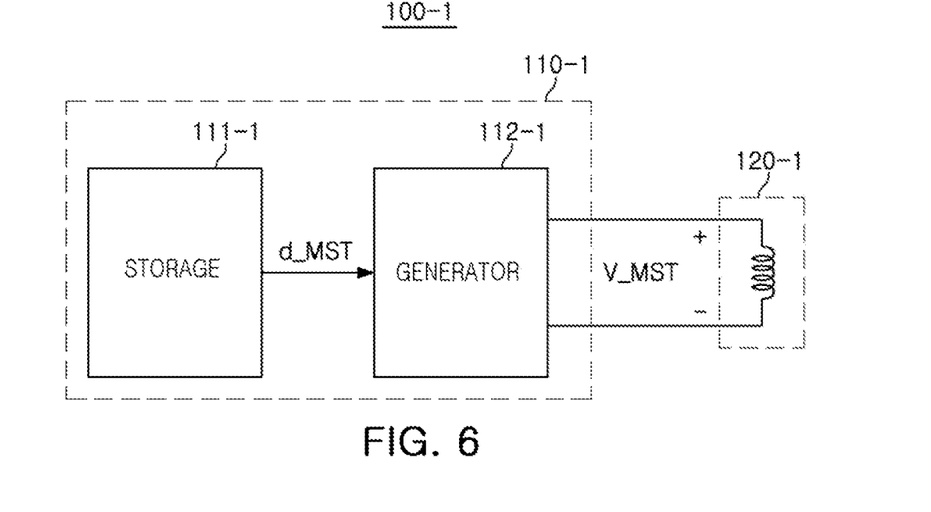
FIG. 6 is a view illustrating the information transmitter, according to an embodiment illustrated in FIG. 2.

FIG. 6 is a view illustrating an example of a signal generator of the information transmitter, according to an embodiment illustrated in FIG. 2. The information transmitter 100-1 includes a signal generator 110-1 and a transmitting coil 120-1. The signal generator 110-1 includes a memory or a storage 111-1 and a generator 112-1.

The storage 111-1 stores information signal values d_MST corresponding to magnitudes of information signals depending on a unit of time therein, and provides the stored information signal values. The information signal values d_MST may be digital values.

The generator 112-1 generates an information signal V_MST having a magnitude corresponding to the information signal values d_MST, in response to the information signal values d_MST received from the storage 111-1. The information signal V_MST may be an analog signal.

That is, the storage 111-1 stores the information signal values d_MST to generate the information signal V_MST having a form similar to any one of signal forms illustrated in FIGS. 5A through 5F, depending on the information to be transmitted therein. For example, in response to generating the information signal V_MST having a form similar to a form illustrated in FIG. 5A, the storage 111-1 stores values such as [Vdd, 0.9 Vdd, 0.8 Vdd, . . . , 0.1 Vdd, 0] as information signal values d_MST of which digital values correspond to "1" therein, and stores values such as [−Vdd, −0.9 Vdd, −0.8 Vdd, . . . , −0.1 Vdd, −0] as information signal values d_MST of which digital values correspond to "0" therein. Further, in response to a digital value of the information to be transmitted being "1", the storage 111-1 sequentially outputs or provides [Vdd, 0.9 Vdd, 0.8 Vdd, . . . , 0.1 Vdd, 0] as the information signal values d_MST, and, in response to a digital value of the information to be transmitted being "0", the storage 111-1 sequentially outputs or provides [−Vdd, −0.9 Vdd, −0.8 Vdd, . . . , −0.1 Vdd, −0] as the information signal values d_MST. In an example, the storage 111-1 outputs the information signal values d_MST, as described above, in response to a read command input from the generator 112-1 or a controller (to be described and illustrated in FIG. 7, for example).

The generator 112-1 outputs the information signal V_MST having the magnitude corresponding to the information signal values d_MST received from the storage 111-1. In this example, the information signal V_MST is an analog signal with a magnitude at a point in time at which each of the information signal values d_MST, output from the storage 111-1, has a magnitude corresponding to the output information signal value d_MST.

The transmitting coil 120-1 may be the same as the transmitting coil 120 described with reference to FIG. 2.

Figure 5E:
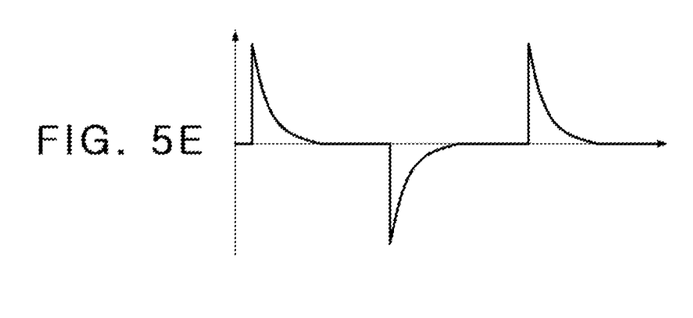
Figure 5F:
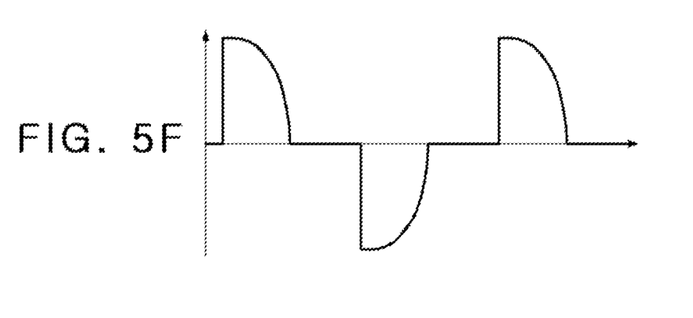
Figure 7:
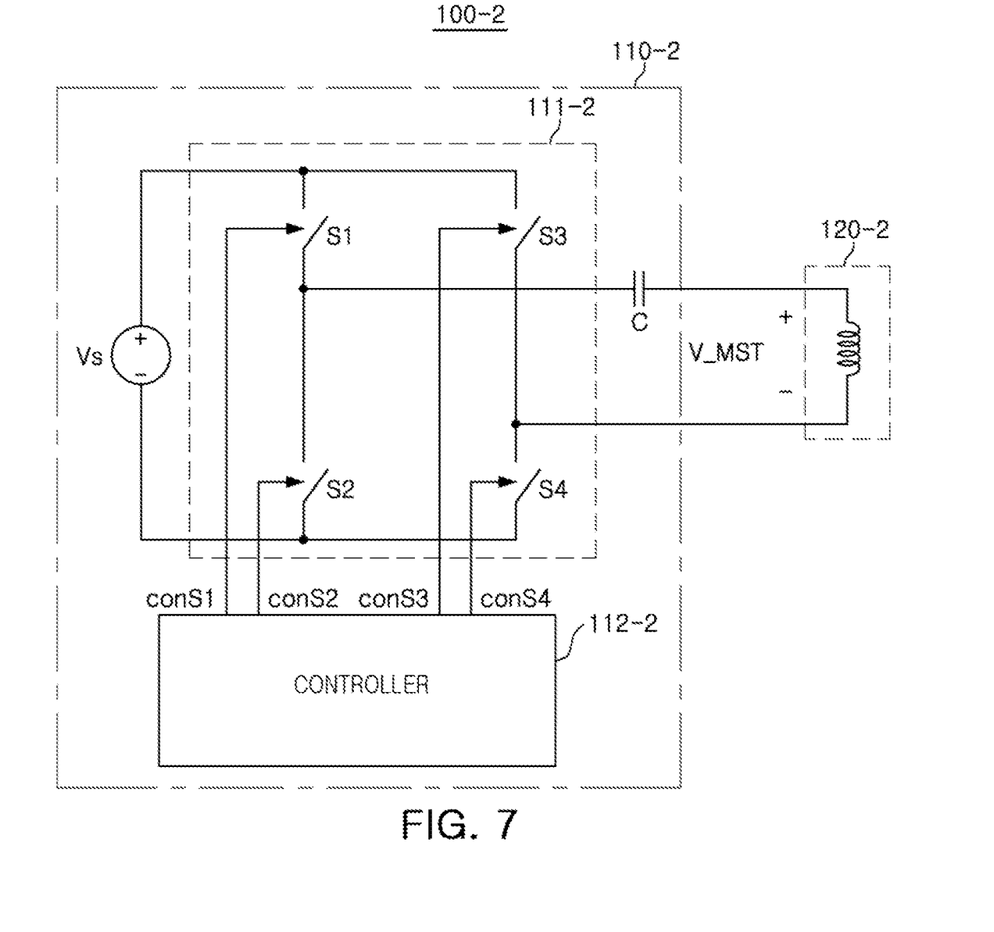
FIG. 7 is a view illustrating the information transmitter, according to an embodiment illustrated in FIG. 2.

FIG. 7, which is a view illustrating an example of the information transmitter, according to an embodiment illustrated in FIG. 2, illustrates the information transmitter generating the information signal illustrated in FIG. 5E. The information transmitter 100-2, according to an embodiment, includes a signal generator 110-2 and a transmitting coil 120-2. The signal generator 110-2 includes a switch 111-2, a controller 112-2, and a capacitor C. In FIG. 7, Vs, which refers to power, such as a direct current (DC) voltage having a predetermined magnitude. In a case in which the information transmitter, according to an embodiment, is mounted in the apparatus, the battery 10 (see FIG. 1) of the apparatus supplies the power Vs.

The switch 111-2 includes a plurality of switches S1 to S4 that turn on or off in response to control signals conS1, conS2, conS3, and conS4. The switches S1 and S2 are connected to each other in series between a terminal to which the DC voltage is applied and a ground, and the switches S3 and S4 may be connected to each other in series between a terminal to which the DC voltage is applied and a ground.

The capacitor C is connected between a connection node between the switches S1 and S2 of the switch 111-2 and the transmitting coil 120-2.

One end of the transmitting coil 120-2 is connected to the capacitor C, and the other end of the transmitting coil 120-2 are connected to a connection node between the switches S3 and S4.

The controlling unit 112-2 outputs the control signals conS1, conS2, conS3, and conS4 depending on the information to be transmitted.

For example, in an example in which the information to be transmitted is "1", the controlling unit 112-2 outputs the control signals conS1, conS2, conS3, and conS4 so that the switches S1 and S4 are turned on and the switches S2 and S3 are turned off. In this case, a voltage of the information signal V_MST, which is a positive voltage determined depending on a voltage by the power Vs and a voltage previously stored in the capacitor C, may be changed in a step function form. Then, the voltage by the power Vs is charged in the capacitor C with the passage of time or after a period of time has lapsed. Therefore, the voltage of the information signal V_MST exponentially changes to 0V. In an example in which the information to be transmitted is "0", the controlling unit 112-2 outputs the control signals conS1, conS2, conS3, and conS4 so that the switches S1 and S4 are turned off and the switches S2 and S3 are turned on. In this example, a voltage of the information signal V_MST, which is a negative voltage determined based on a voltage by the power Vs and a voltage previously stored in the capacitor C, changes in a step function form. Then, the voltage by the power Vs is charged in the capacitor C with the passage of time or after a period of time has lapsed. Therefore, the voltage of the information signal V_MST exponentially changes to 0V.

The transmitting coil 120-2 is connected between the other end of the capacitor C and the connection node between the switches S3 and S4 of the switch 111-2.

As set forth above, in the information transmitter and the apparatus including the same, according to an embodiment, power consumed at the time of transmitting information is reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus, comprising:
   a signal generator configured to output an information signal, the information signal comprising pulses changed from a state of zero voltage to a state of a positive reference voltage or a state of a negative reference voltage and subsequently changed from the state of the positive reference voltage or the state of the negative reference voltage to the state of zero voltage, such that (1) a first time period in which some of the pulses are changed from the state of zero voltage to the state of the positive reference voltage or the state of the negative reference voltage satisfies a first condition having a step function, (2) a second time period in which some of the pulses are changed from the state of the positive reference voltage or the state of the negative reference voltage to the state of zero voltage satisfies a second condition other than the step function, (3) the state of the positive reference voltage is maintained for a third time period after a first change from the state of zero voltage to the state of the positive reference voltage, and (4) the state of the negative reference voltage is maintained for the third time period after a second change from the state of zero voltage to the state of the negative reference voltage; and
   a transmitting coil configured to receive the information signal and generate a magnetic field based on the information signal,
   wherein the signal generator comprises,
   a controller configured to output a control signal based on information to be transmitted, and
   a generator configured to output the information signal in response to the control signal, and
   wherein the generator comprises,
   a capacitor connected to the transmitting coil in series, and
   at least one switch configured to apply a voltage to one end of the capacitor in response to the control signal.

2. The apparatus of claim 1, wherein the information signal linearly changes with respect to a time in some sections thereof in response to the information signal changing from the state of the positive reference voltage or the state of the negative reference voltage to the state of zero voltage.

3. The apparatus of claim 1, wherein the information signal exponentially changes with respect to a time in some sections in response to the information signal changing from the state of the positive reference voltage or the state of the negative reference voltage to the state of zero voltage.

4. The apparatus of claim 1, wherein the information signal changes from the state of the positive reference voltage or the state of the negative reference voltage to the state of zero voltage after a fourth time period elapses.

5. The apparatus of claim 1, wherein the signal generator comprises:
   a storage configured to store information signal values corresponding to a magnitude of the information signal based on a time and provide the information signal values; and
   an information signal generator configured to generate the information signal in response to the information signal values.

6. An apparatus, comprising:
   a battery configured to supply power; and
   an information transmitter configured to receive the power and transmit information, the information transmitter comprising,
   a signal generator configured to output an information signal, the information signal comprising pulses changed from a state of zero voltage to a state of a positive reference voltage or a state of a negative reference voltage and subsequently changed from the state of the positive reference voltage or the state of the negative reference voltage to the state of zero voltage, such that (1) a first time period in which some of the pulses are changed from the state of zero voltage to the state of the positive reference voltage or the state of the negative reference voltage satisfies a first condition having a step function, (2) a second time period in which some of the pulses are changed from the state of the positive reference voltage or the state of the negative reference voltage to the state of zero voltage satisfies a second condition other than the step function, (3) the state of the positive reference voltage is maintained for a third time period after a first change from the state of zero voltage to the state of the positive reference voltage, and (4) the state of the negative reference voltage is maintained for the third time period after a second change from the state of zero voltage to the state of the negative reference voltage, and
   a transmitting coil configured to receive the information signal and generate a magnetic field based on the information signal to transmit the information,
   wherein the signal generator comprises,
   a controller configured to output a control signal based on information to be transmitted,
   a capacitor connected to the transmitting coil in series, and
   at least one switch configured to apply a voltage to one end of the capacitor in response to the control signal.

7. The apparatus of claim 6, wherein the information signal changes from the state of the positive reference voltage or the state of the negative reference voltage to the state of zero voltage after a fourth time period elapses.

8. The apparatus of claim 6, wherein the signal generator comprises:
   a storage configured to store information signal values corresponding to a magnitude of the information signal based on a time and provide the information signal values; and
   an informational signal generator configured to generate the information signal in response to the information signal values.

9. An information transmitter, comprising:
   a signal generator comprising,
   a storage configured to store an information signal value corresponding to a magnitude of an information signal, and
   a generator circuit configured to generate the information signal having a magnitude corresponding to the information signal value, the information signal comprising a first pulse shifted from a state of zero voltage to a state of a positive reference voltage or a state of a negative reference voltage in a first time period and a second pulse shifted from the state of the positive reference voltage or the state of the negative reference voltage to the state of zero voltage in a second time period, such that (1) the first time period satisfies a condition having a step function, (2) the second time period satisfies a condition other than the step function, (3) the state of the positive reference voltage is maintained for a third time period after a first change from the state of zero voltage to the state of the positive reference voltage, and (4) the state of the negative reference voltage is maintained for the third time period after a second change from the state of zero voltage to the state of the negative reference voltage; and a transmitting coil configured to produce a magnetic flux based on the information signal,
wherein the signal generator further includes,
a control circuit configured to output a control signal based on information to be transmitted,
a capacitor connected to the transmitting coil in series, and
at least one switch configured to apply a voltage to one end of the capacitor in response to the control signal.

10. The information transmitter of claim 9, wherein an amount of consumed power is in proportion to a value obtained by integrating a square of a voltage of the information signal applied to the transmitting coil with respect to a time.

11. The information transmitter of claim 9, wherein the magnetic flux varies based on a type of the information signal to be transmitted.

12. The apparatus of claim 6, wherein the information transmitter is configured to transmit information based on a magnetic secure transfer scheme.

* * * * *